United States Patent [19]

Hixon et al.

[11] Patent Number: 5,187,764
[45] Date of Patent: Feb. 16, 1993

[54] CONDUIT FOR FIBER OPTICAL CABLES

[75] Inventors: Kenneth L. Hixon, Dallas; James E. Bruce, Austin, both of Tex.

[73] Assignee: CableLite Corporation, Dallas, Tex.

[21] Appl. No.: 691,451

[22] Filed: Apr. 25, 1991

[51] Int. Cl.⁵ .............................................. G02B 6/44
[52] U.S. Cl. ..................................... 385/102; 385/137
[58] Field of Search ............... 350/96.2, 96.21, 96.22, 350/96.23; 385/102, 92, 137, 76, 56, 145, 123

[56] References Cited

U.S. PATENT DOCUMENTS

| | | | |
|---|---|---|---|
| 4,714,316 | 12/1987 | Moore et al. | 350/96.23 X |
| 4,752,111 | 6/1988 | Fisher | 385/56 X |
| 4,957,347 | 9/1990 | Zarian | 385/145 X |
| 4,964,688 | 10/1990 | Caldwell et al. | 350/96.2 |
| 4,978,194 | 12/1990 | Allen et al. | 350/96.2 X |
| 5,052,778 | 10/1991 | Jamshid | 385/123 X |

Primary Examiner—John D. Lee
Assistant Examiner—Phan T. Heartney
Attorney, Agent, or Firm—Jaimes Sher

[57] ABSTRACT

A conduit for receiving lengths of fiber optical cable, which enhances light emission and transmission within the cable by substantially reducing an air gap located between a polymeric core and an outer cladding of the fiber optical cable. The conduit of the present invention has a retaining member that defines a first channel adapted to receive the fiber optical cable and a base member that defines a second channel adapted to receive the cable. The retaining member is mounted with the base member, such that the cable is retained within the first and the second channels and a compressive force is exerted on the cable, which substantially eliminates the gap between the core and outer cladding. Furthermore, the conduit of the present invention supports and guides the cable and facilitates the installation thereof.

20 Claims, 2 Drawing Sheets

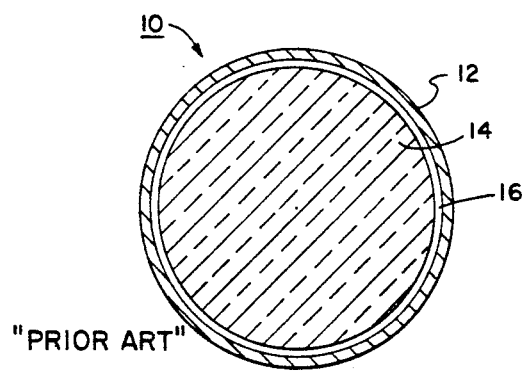
FIG. 1 "PRIOR ART"
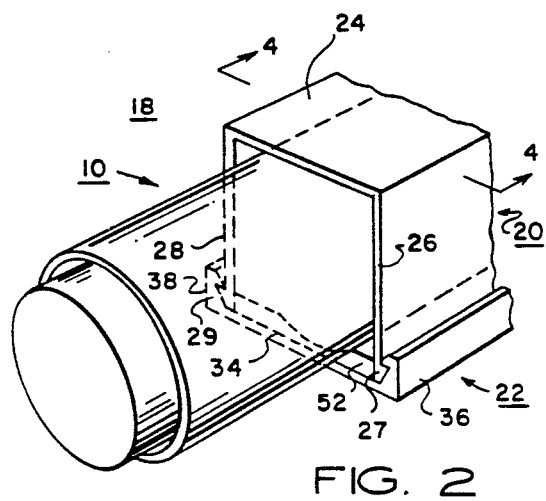
FIG. 2
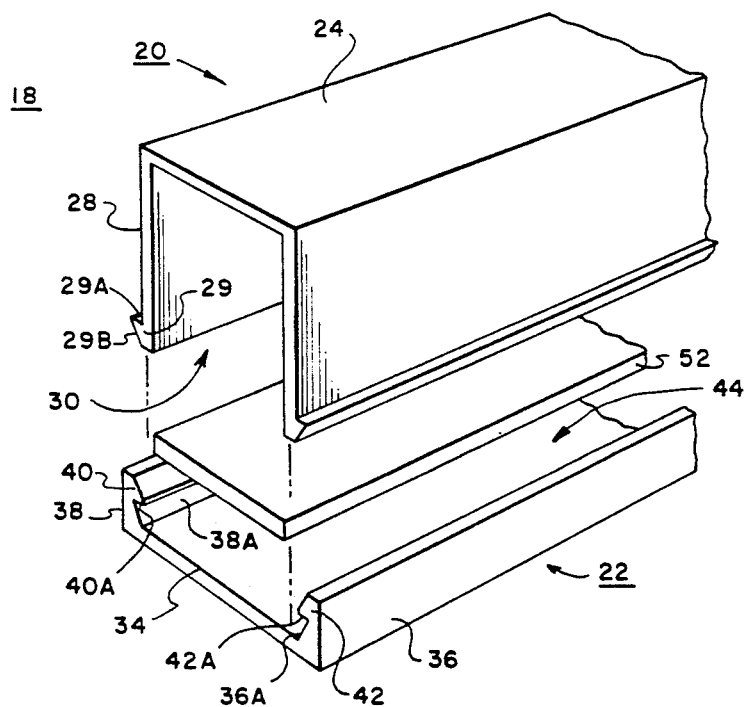
FIG. 3

CONDUIT FOR FIBER OPTICAL CABLES

FIELD OF THE INVENTION

This invention relates generally to the art of fiber optics, and in particular to a conduit which increases the optical efficiency of a fiber optical cable, and simultaneously provides a channel within which a fiber optical cable is supported and guided.

BACKGROUND OF THE INVENTION

The use of a solid core light transfer media, fiber optical cables for use in general, specialized and display lighting have been widely accepted and very popular in the United States and all over the world. For instance, fiber optical cables have been used for outdoor lighting, shopping center displays, signs, nightclub lighting effects and even to outline large buildings.

These fiber optical cables allow the transfer of light without electricity. This factor is particularly important where the hazards of electricity, heat generation and space restrictions render conventional lighting unsuitable and in some instances dangerous. For example, conventional lighting when in contact with water can cause dangerous electrical shocks. However, fiber optical cables provide a safe light transfer medium for almost all kinds of environmental conditions.

In view of the many uses of fiber optical cables, it has been very difficult and expensive to produce a light cable that will transmit light effectively and uniformly over long distances with sufficient light intensity or brightness.

DESCRIPTION OF THE PRIOR ART

Typically, light-guiding optical fibers comprise a cylindrical polymeric core having a relatively high refractive index and a tubular cladding having a low refractive index surrounding the core. Therebetween the outer surface of the core and the inner surface of the cladding is a gap of air or other material. Optical fibers made by a conventional process have a non-uniform and relatively wide air gap (e.g. gap size of approximately 0.003 to 0.005 inches) between the core and the cladding. These wide and irregular spacings of air between the core and the cladding cause bright and dark spots of light to emanate from the outer surface of a fiber optical cable. Consequently, fiber optical cables having excessive and/or varying gap widths between the core and the cladding have very poor light emittance of transmission characteristics.

It is well known in the prior art that the reduction of this air space between the core and the cladding will result in a fiber optical cable with improved light emittance and transmission. Minimizing this gap both in width and uniformity improves the efficiency, intensity and uniformity of the light traveling through a fiber optical cable. Light travelling within a fiber optical cable having no gap or a negligible gap can be transmitted with enhanced brightness over longer lengths of cable.

One type of fiber optical cable known in the prior art, as disclosed in U.S. Pat. No. 4,957,347, has a polymeric core surrounded by a heat shrinkable outer cladding. The air space between the core and the cladding is uniformly narrowed as a result of using a heat shrinkable material. By shrinking the cladding around the polymeric core, the air space between the core and the cladding is reduced, but not eliminated.

Furthermore, it is also well known in the art to use profiles or conduits to guide and support fiber optical cables. The conduits not only provide a channel to receive the optical cables, but also provide for colored lighting when such conduits are color-tinted.

Hence, the advantage of eliminating the aforementioned air gap to enhance light emittance and transmission in fiber optical cables, and the concurrent need for a conduit to support these cables makes the fiber optical conduit of the present invention a practical and an economical alternative to current fiber optical light technology, which is very expensive. Thus, there has been a long-standing need in the art for an effective way to substantially eliminate this air gap without using expensive heat shrinkable materials, while at the same time providing a conduit for supporting and installing fiber optical cables.

OBJECTS OF THE INVENTION

It is therefore, an object of the present invention to provide a new and improved conduit that increases the optical efficiency of a fiber optical cable.

It is a further object of the present invention to provide a new and improved conduit, which substantially eliminates the air gap between the core and cladding of a fiber optical cable.

Still another object of the present invention is to provide a new and improved conduit for use with optical fiber cables that significantly increases the efficiency and uniform light emission and transmission properties of fiber optical cables.

Another object of the present invention is to provide a new and improved conduit which eliminates the air gap between the core and cladding of the fiber optical cable and provides a channel for supporting a fiber optical cable.

Yet another object of the present invention is to provide a new and improved conduit which facilitates the installation of fiber optical cables.

Still another object of the present invention is to reduce the expense associated with fiber optical cables.

SUMMARY OF THE INVENTION

The fiber optical cable conduit of this present invention is for enhancing light emissions from a fiber optical cable. The cable has a cladding concentrically disposed about a core, with a gap between the core and the cladding. The conduit has a retaining member defining a first channel and a base member defining a second channel, where both first and second channels are adapted to receive a fiber optical cable, and where the retaining member is mountable within the base member to retain the cable within the first and second channels and to exert a compressive force on the cable to substantially eliminate the gap.

Furthermore, the retaining member has a top wall and first and second opposed side walls and the base member has a bottom portion and third and fourth opposed side walls, where the first and second side walls are deflectable to allow respective portions of the first and second side walls to be received within the second channel, and the first and second side walls yielding against the respective third and fourth side walls when the respective portions of the first and second side walls are received in the second channel. The top wall, the first and second side walls and the bottom portion cooperate to exert the compressive force on the cable, therefore, substantially eliminating the gap.

BRIEF DESCRIPTION OF THE DRAWINGS

The foregoing objects, features, and advantages of the invention will become clearer and more fully understood when the following detailed description is read in conjunction with the accompanying drawings, in which:

FIG. 1 is a cross-sectional view of a conventional fiber optical cable;

FIG. 2 is a perspective view of a fiber optical cable conduit according to the present invention, showing a fiber optical cable extending through the conduit;

FIG. 3 is an exploded perspective view of the conduit of FIG. 2;

DETAILED DESCRIPTION OF THE PREFERRED EMBODIMENT

Figure 4:
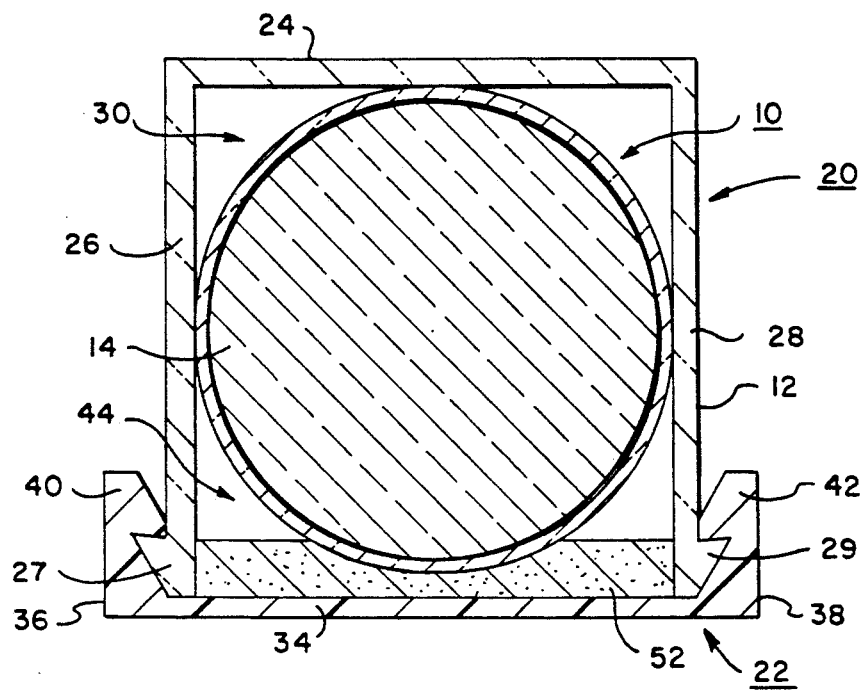
FIG. 4 is a cross-sectional view of the conduit of FIG. 2, taken along the lines 4—4 of FIG. 2.
Figure 5:
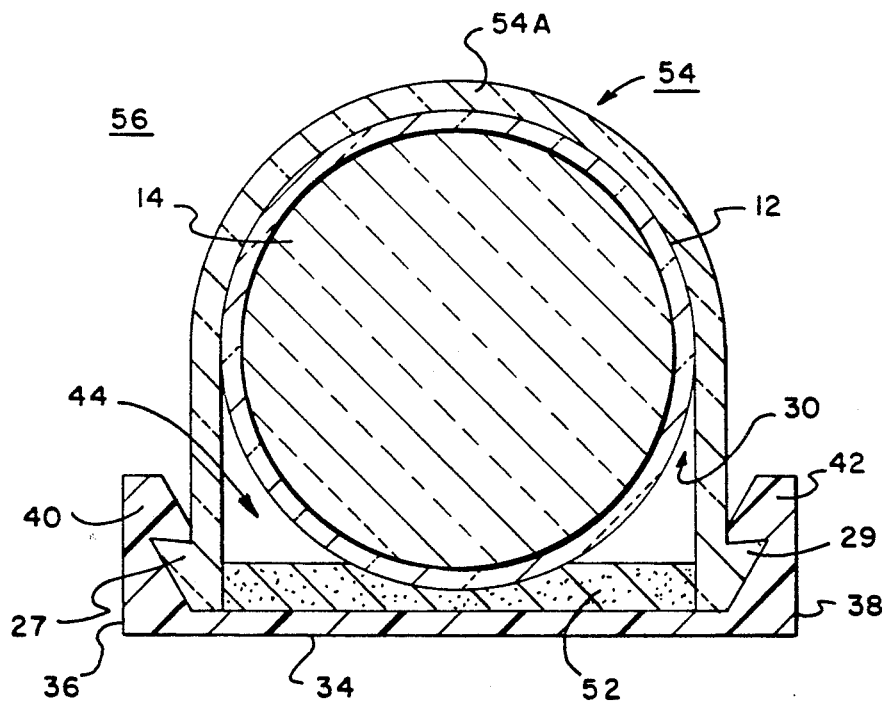
FIG. 5 is a cross-sectional view of an alternate embodiment of a fiber optical cable conduit, according to the present invention.

In the description which follows, like parts are indicated throughout the specification and drawings with the same reference numerals, respectively. The drawings are not necessarily to scale, and certain parts have been exaggerated to better illustrate the details of the present invention.

By referring to FIG. 1, a conventional optical fiber cable will be described to provide a meaningful context within which a preferred embodiment of the present invention will be described. Illustrated in FIG. 1 is a cross-sectional view of a conventional fiber optical cable 10 as is known from the prior art.

Optical fiber as herein described are generally manufactured by a process in which a cylindrical tube 12 made from a fluorinated ethylenepropylene copolymer, such as the type of copolymer manufactured and sold by the Du Pont de Nemours, E. I. Company, Wilmington, Del. 19898 under the trademark TEFLON, is filled with a monomer mixture, which is polymerized in a reactor to form a flexible light transmitting and emitting polymeric core 14. Core 14 has a relatively high refractive index as compared with the, relatively, low refractive index of the surrounding tube 12, which is referred to in the art as the outer cladding. During polymerization, the core 14 typically shrinks in both diameter and length relative to the monomer filling in the outer cladding 12. This shrinkage creates a gap 16 between the core 14 and the cladding 12. Although the gap 16 usually contains air, it can contain other materials that have a lower refractive index than the polymeric core 14. Optical fibers made by the aforementioned process have non-uniform gaps 16 between the core 14 and the cladding 12. The irregularity of the air gap 16 causes bright and dark spots of light to be emitted from the optical cable 10. As a consequence of this spotting effect, the optical efficiency of fiber optical cable 10 is reduced.

As previously described, the prior art discloses the use of heat shrinkable material as the outer cladding 12. After polymerization of the core monomer and subsequent shrinkage thereof, heat is then applied to the outer cladding 12 to shrink it around the polymeric core 14, thereby reducing the size of the air gap 16.

In accordance with the present invention, a fiber optical cable conduit is provided, which increases the optical efficiency of fiber optical cables and at the same time provides a channel to install, support and guide fiber optical cables.

Referring now to FIG. 2, a length of fiber optical cable 10 length extends through a conduit 18, according to the present invention. Referring also to FIG. 3, conduit 18 includes a retaining member 20 and a base member 22. Retaining member 20 has a top wall 24 and deflectable side walls 26 and 28 depending from top wall 24, such that side walls 26 and 28 cooperate with the top wall 24 to define an inverted U-shaped channel 30. Channel 30 is adapted to receive a length of fiber optical cable 10. As can best be seen in FIG. 2, cable 10 extends through conduit 18, such that a portion of cable 10 protrudes from conduit 18 to allow cable 10 to be cut to the desired length. Now also referring to FIGS. 2 and 3, side walls 26 and 28 respective outwardly projecting bottom flanges 27 and 29, extending substantially along the entire length of conduit 18. Base member 22 has a relatively flat bottom portion 34 and opposed upstanding side walls 36 and 38. Side walls 36 and 38 cooperate with bottom portion 34 to define a substantially U-shaped channel 44. Side walls 36 and 38 have respective inwardly projecting top flanges 40 and 42, extending substantially along the entire length of conduit 18.

Cable 10 is inserted into base member 22, so that cable 10 is received within channel 44. Retaining member 20 is then inserted into base member 22 by compressing respective lower portions of side walls 26 and 28 (including flanges 27 and 29) inwardly and inserting the respective lower portions of side walls 26 and 28 into channel 44.

When retaining member 20 is positioned with respect to base member 22 such that respective lower portions (including flanges 27 and 29) of side walls 26 and 28 are received within channel 44, side walls 26 and 28 exert a positive pressure against the side walls 36 and 38. Respective top surfaces of flanges 27 and 29 define respective shoulders 27A and 29A and respective bottom surfaces of flanges 40 and 42 define respective shoulders 40A and 42A. Shoulders 27A and 29A engage respective shoulders 40A and 42A to prevent retaining member 20 from being disengaged from base member 22 along a vertical axis. Respective outwardly facing surfaces 27B and 29B of flanges 27 and 29 are beveled to engage complementary beveled surfaces 36A and 38A of side walls 36 and 38. A pad 52 which is made of a resilient, preferably translucent, material, such as foam rubber or the like, is positioned within channel 44 and rests on bottom portion 34. Pad 52 acts as a filler material so that conduit 18 can be used with cables 10 of varying diameter and provides a cushion to prevent the compressive force from damaging the cable 10.

Now referring to FIG. 4, pad 52 is shown supporting a portion of the fiber optical cable 10. Furthermore, the retaining member 20 and base member 22 cooperate to hold fiber optical cable 10 within channels 30 and 44.

In accordance with the present invention, a compressive force is exerted on cable 10 by top member 24, deflectable side walls 26 and 28 and bottom portion 34 to substantially eliminate the gap between the outer cladding 12 and inner core 14 of cable 10. Elimination of the gap significantly increases the optical efficiency of the fiber optical cable 10. Optical efficiency is defined as the ratio of light output of light input for a given length and cross-section of a fiber optical cable. Light emitting from the outer periphery of outer cladding 12 of fiber optical cable 10 received within the conduit 18 of the present invention is significantly brighter than in the prior art fiber optical cables and the emitted light has the appearance of a neon light.

Alternatively, the retaining member 20 and base member 22 can be made from polyvinylchloride, acrylic or any pliable translucent material. In the preferred embodiment, the retaining member 20 and the base member 22 are made of a thermoplastic carbonate linked polymer, manufactured and sold by General Electric Company, Pittsfield, Mass. 01201, under the trademark LEXAN. In another embodiment, the retaining member 20 is color-tinted so when light is transferred through fiber optical cable 10, the emitted light appears to be colored.

In operation, a length of fiber optical cable 10 is positioned within channel 44 of base member 22. Retaining member 20 is then positioned above base member 22, such that cable 10 is also received within channel 30. While compressing the deflectable side walls 26 and 28 together, the retaining member 20 is lowered into channel 44, such that the flanges 27 and 29 engage respective side walls 36 and 38 and flange 40 and 42, as previously described, to mount retaining member 20 with base member 22 and retain fiber optical cable 10 in place within conduit 18.

The fiber optical cable conduit 18 according to the present invention also protects fiber optical cable 10, as well as increases the optical efficiency thereof. In almost all installations of fiber optical cables, profiles are used to protect and guide the cables. According to prior practice, these profiles only provide a channel to receive the fiber optical cables and do not increase the optical efficiency of the cables.

In an alternate embodiment of the invention, a top portion 54A of a retaining member 54 of a conduit 56 is rounded to substantially conform to the shape of the fiber optical cable 10. Conduit 56 not only has an enhanced aesthetic quality, but also increases the optical efficiency of the fiber optical cable 10 by exerting a compressive force on a substantially area of outer cladding 12 of cable 10.

While a preferred embodiment of the present invention has been shown and described herein, further modifications and improvements may be made by those skilled in the art. For example, advantages of the conduit 18 of the present invention can still be seen using fiber optical cable having a heat shrinkable outer cladding. The foregoing disclosure and description of the invention are illustrated in explanation thereof, and various changes in the size, shape and materials, as well as in the details of the illustrated construction may be made without departing from the spirit of the invention.

What is claimed is:

1. A conduit for a fiber optical cable or the like, said cable having a cladding concentrically disposed about a core, with a gap between said core and said cladding, said conduit comprising, in combination:
   a retaining member defining a first channel adapted to receive said cable;
   a base member defining a second channel adapted to receive said cable;
   said retaining member being mountable with said base member to retain said cable within said first and second channels and to exert a compressive force on said cable to substantially eliminate said gap.

2. A conduit in accordance with claim 1, wherein said retaining member has a top wall and first and second opposed side walls and said base member has a bottom portion and third and fourth opposed side walls, said first and second side walls being deflectable to allow respective portions of said first and second side walls to be received within said second channel, said first and second side walls yielding against the respective third and fourth side walls when said respective portions of said first and second side walls are received in said second channel, said top wall, said first and second side walls and said bottom portion cooperating to exert said compressive force on said cable.

3. A conduit in accordance with claim 2, wherein said first and second side walls have respective outwardly projecting bottom flanges, and said third and fourth side walls have respective inwardly projecting top flanges, respective upper surfaces of said bottom flanges defining first and second shoulders and respective lower surfaces of said top flanges defining third and fourth shoulders, said first and second shoulders being adapted to engage the respective third and fourth shoulders when said first and second flanges are received within said second channel.

4. A conduit as defined in claim 3, wherein said first and second flanges have respective outwardly facing surface adapted to engage respective inwardly facing surfaces of said third and fourth side walls when the respective portions of the first and second side walls are received in the second channel.

5. A conduit as defined in claim 4, wherein said outwardly facing surfaces are beveled to define respective first and second beveled surfaces and said inwardly facing surfaces are beveled to define respective third and fourth beveled surfaces which are complementary with the respective first and second beveled surfaces.

6. A conduit as defined in claim 1, further including a resilient member, located within said second channel and adapted to be positioned between said cable and said bottom portion.

7. A conduit as defined in claim 1, wherein said retaining member and base member are made of a pliable material.

8. A conduit in accordance with claim 7, wherein said pliable material is transparent.

9. A conduit in accordance with claim 8, wherein said pliable material is color-tinted.

10. A conduit in accordance with claim 1, wherein said retaining member and base member are composed of a thermoplastic carbonate linked polymer.

11. A conduit for enhancing light emissions from a fiber optical cable said cable having a cladding concentrically disposed about a core, with a gap between said core and said cladding, said conduit comprising, in combination:
    a retaining member defining a first channel adapted to receive said cable;
    a base member defining a second channel adapted to receive said cable;
    said retaining member being mountable with said base member to retain said cable within said first and second channels and to exert a compressive force on said cable to substantially eliminate said gap.

12. A conduit in accordance with claim 11, wherein said retaining member has a top wall and first and second opposed side walls and said base member has a bottom portion and third and fourth opposed side walls, said first and second side walls being deflectable to allow respective portions of said first and second side walls to be received within said second channel, said first and second side walls yielding against the respective third and fourth side walls when said respective portions of said first and second side walls are received in said second channel, said top wall, said first and second side walls and said bottom portion cooperating to exert said compressive force on said cable.

13. A conduit in accordance with claim 12, wherein said first and second side walls have respective outwardly projecting bottom flanges, and said third and fourth side walls have respective inwardly projecting top flanges, respective upper surfaces of said bottom flanges defining first and second shoulders and respective lower surfaces of said top flanges defining third and fourth shoulders, said first and second shoulders being adapted to engage the respective third and fourth shoulders when said first and second flanges are received within said second channel.

14. A conduit as defined in claim 13, wherein said first and second flanges have respective outwardly facing surfaces adapted to engage respective inwardly facing surfaces of said third and fourth side walls when the respective portions of the first and second side walls are received in the second channel.

15. A conduit as defined in claim 14, wherein said outwardly facing surfaces are beveled to define respective first and second beveled surfaces and said inwardly facing surfaces are beveled to define respective third and fourth beveled surfaces which are complementary with the respective first and second beveled surfaces.

16. A conduit as defined in claim 11, further including a resilient member, located within said second channel and adapted to be positioned between said cable and said bottom portion.

17. A conduit for a fiber optical cable or the like, said cable having a cladding concentrically disposed about a core, with a gap between said core and said cladding, said conduit comprising, in combination:
    a retaining member defining a first channel adapted to receive said cable;
    a base member defining a second channel adapted to receive said cable;
    said retaining member being mountable with said base member to retain said cable within said first and second channels and to exert a compressive force on said cable to substantially eliminate said gap;
    said retaining member has a top wall and first and second opposed side walls and said base member has a bottom portion and third and fourth opposed side walls, said first and second side walls being deflectable to allow respective portions of said first and second side walls to be received within said second channel, said first and second side walls yielding against the respective third and fourth side walls when said respective portions of said first and second side walls are received in said second channel, said top wall, said first and second side walls and said bottom portion cooperating to exert said compressive force on said cable; and
    a resilient member, located within said second channel and adapted to be positioned between said cable and said bottom portion.

18. A conduit in accordance with claim 17, wherein said first and second side walls have respective outwardly projecting bottom flanges, and said third and fourth side walls have respective inwardly projecting top flanges, respective upper surfaces of said bottom flanges defining first and second shoulders and respective lower surfaces of said top flanges defining third and fourth shoulders, said first and second shoulders being adapted to engage the respective third and fourth shoulders when said first and second flanges are received within said second channel.

19. A conduit as defined in claim 18, wherein said first and second flanges have respective outwardly facing surfaces adapted to engage respective inwardly facing surfaces of said third and fourth side walls when the respective portions of the first and second side walls are received in the second channel.

20. A conduit as defined in claim 19, wherein said outwardly facing surfaces are beveled to define respective first and second beveled surfaces and said inwardly facing surfaces are beveled to define respective third and fourth beveled surfaces which are complementary with the respective first and second beveled surfaces.

* * * * *